Jan. 14, 1930. J. C. STIMSON 1,743,834
REFLECTING DEVICE
Filed July 29, 1925    2 Sheets-Sheet 1

Inventor.
JONATHAN C. STIMSON.
By John H. Bruninga
Attorney.

Jan. 14, 1930.  J. C. STIMSON  1,743,834
REFLECTING DEVICE
Filed July 29, 1925  2 Sheets-Sheet 2

Inventor:
Jonathan C. Stimson.
By John H. Bruninga
Attorney.

Patented Jan. 14, 1930

1,743,834

UNITED STATES PATENT OFFICE

JONATHAN C. STIMSON, OF ST. LOUIS, MISSOURI

REFLECTING DEVICE

Application filed July 29, 1925. Serial No. 46,821.

This invention relates to reflecting devices and more particularly to devices employing the principles and features of what are known as "central triple reflectors." This application is a continuation in part of application Serial No. 650,402, filed July 9th, 1923, now Patent No. 1,671,086, granted May 22, 1928, as to subject-matter common to the applications.

Such a reflector has a series of reflecting surfaces arranged relatively at right angles and in a circuit around the reflector axis and has the property of reflecting incident beams back to their source irrespective (within limits) of the angle of incidence of such a beam with respect to the axis. Where the reflector is a prism causing refraction of the incident beam, the limiting angle of incidence (with respect to the axis) can be increased while the loss of reflected rays is decreased for any given angle of incidence.

In the accompanying drawing

Figure 1:
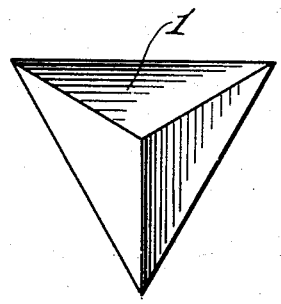
Figure 1 is a rear view of a central triple reflector.
Figure 2:
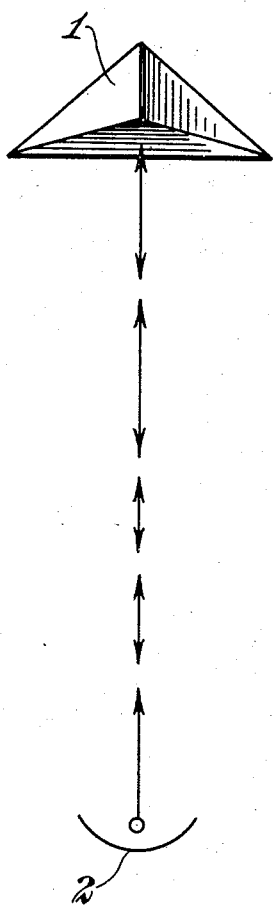
Figure 2 is a view showing the reflector of Figure 1 in perspective and showing the paths of incident and reflected beams.

Referring to the accompanying drawing, Figures 1 and 2 show a central triple reflector in the form of a prism 1 of glass or other transparent material, the reflecting surfaces of which are in exactly right angular relation and are highly polished to be optically plane so as to form an optically true, congruent trihedral angle. A beam from a source of light 2, impinging on such a reflector and having a cross-sectional area equal to the reflector aperture, will be reflected directly back to its source, the reflected beam being in fact superimposed upon the impinging beam; this is true irrespective, within limits, of the angle of incidence of the impinging beam. It will be readily seen that such a reflector has limited practical application for the reason that the reflector beam is only observable on a line connecting the source of light with the reflector.

Figure 4:
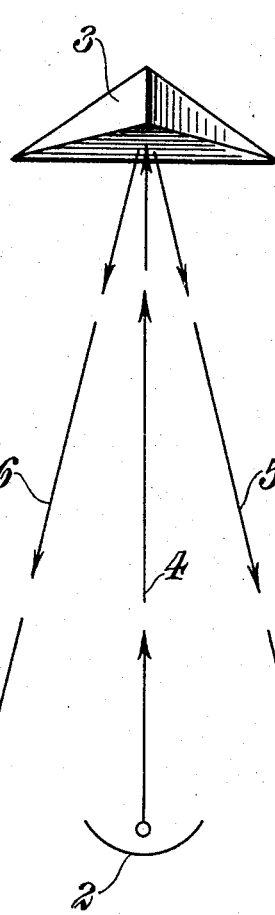

If the mutual relation of the surfaces of the reflector is disturbed, even slightly, from that of an optically true, congruent trihedral angle, then the reflected beam is not returned to the source and is not observable thereat, but the incident beam is reflected in the form of two or more pencils of light having the same intensity as the impinging beam, the sum of the cross sections of the reflected pencils being equal to the cross section of the impinging beam. These reflected pencils deviate angularly in their reflected course from the direction of the impinging beam as shown (exaggerated) in Figure 4, the extent of the angular deviation, the number of pencils formed, and the relative positioning of the reflected pencils with respect to the incident beam depending upon, first whether one or all of the surfaces vary from the ninety degree (90°) angular relation, second the extent of the angular deviation from ninety degrees (90°), and third the orientation of the surfaces of the reflector 3 with respect to the original beam. If only one surface deviates angularly as shown in Figure 4, then a beam 4 impinging upon such a reflector 3 will be reflected in the form of two pencils 5 and 6, while if more than one surface deviates, the reflection will be in the form of six pencils. The above is true irrespective, within limits, of the angle of incidence of the impinging beam with respect to the axis of the reflector.

Figure 3:
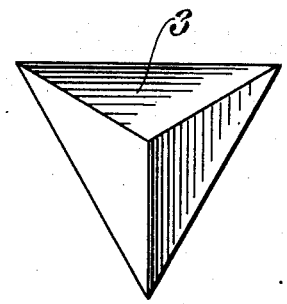
Figures 3 and 4 are views similar to Figures 1 and 2 respectively, but showing a central triple reflector, the angles of one or more surfaces of which are so arranged as to deviate from right angle relation.

While such a distorted triple reflector as shown in Figures 3 and 4 causes an incident beam to be reflected so as to be observable along a line other than that connecting the source with the reflector, it still has limited application for the reason that the reflection is in the form of pencils which are only observable when the observer is in the direct path of these pencils. Thus if the reflector were constructed so that one of the reflected pencils would be observable at a certain distance from the reflector and at a certain distance laterally from the source of light, it would be out of visible range for any other position of the observer with respect to the reflector or the source, except along the path of the reflected pencil.

In order to permit the application of a reflector for practical purposes it is necessary that the reflection be observable within a chosen field or plane transverse of the axis of the reflector.

One of the objects of this invention, therefore, is to provide a reflector of the general character described whose surfaces are so formed as to reflect the impinging light in the form of a beam which is observable laterally of the source of light.

Another object of this invention is to provide a reflector of the general character described whose surfaces are formed so as to reflect the impinging light in the form of a spreading beam, preferably of uniform intensity.

Another object of this invention is to provide a reflector in which a beam impinging thereon will be reflected back in the general direction of the light source, but which has means adapted to spread the reflected light with substantial uniformity throughout its field of spread in order to direct a spreading beam back towards and visible to an observer located a substantial distance outside of a line connecting the reflector with the light source.

Further objects will appear from the detail description.

Generally stated, the reflecting device embodying this invention comprises a series of reflecting surfaces arranged relatively at approximate right angles and in a circuit around the reflector axis, so that light impinging thereon from a distant source will be successively reflected by these surfaces about the reflector axis and back in the general direction of the light source. Means is, however, provided to spread the reflected light with substantial uniformity throughout its field of spread in order to direct a spreading beam back towards and visible to an observer located a substantial distance outside of a line connecting the reflector with the light source.

In accordance with one embodiment of this invention, this spreading means is in front of but co-operates with the reflecting surfaces to secure the desired result. In one of the embodiments illustrated, the means is a heterogeneous refracting means which is adapted to heterogeneously refract the light issuing from the reflector aperture outside of the otherwise normal reflected path.

The reflecting device may be composed of a single unit, either hollow (and therefore provided with silvered reflecting surfaces) or prismatic (and therefore provided with totally reflecting surfaces). In accordance with an embodiment of this invention, a series of these reflecting units is arranged in contiguous relation. These units may be arranged around a central point so as to provide a plurality of groups of reflectors and a diffusing, or rather heterogeneous refracting, means is arranged in front of these groups. With suitable construction and arrangement of reflecting units and diffusing or refracting means, the light reflected from the reflecting surfaces of the reflectors of the respective groups is manifested by spots of light in front of the reflectors of these groups.

The heterogeneous refracting means may be formed and constituted in various manners. Where the reflector is hollow, it may constitute the glass plates, the backs of which are suitably silvered or otherwise formed to provide reflecting surfaces and through which plates the rays must pass. The refracting means may, however, be in the form of a cover glass for such a hollow reflector. As hereafter described, these plates may be constructed of window glass, which is sufficiently wavy to constitute a heterogeneous refracting medium. Where the reflector is of the prismatic type and where it is made by pressing, as described in Patent No. 1,591,572, granted July 6, 1926, so as to form a transparent solid or prismatic reflector, the front face being in that case conformed to the surface of the mould so as to deviate from a plane, there is provided a heterogeneous refracting medium in front of the reflecting surfaces, which, when suitably formed, secures the desired result.

In accordance with this invention, the heterogeneous refracting means serves to slightly spread the reflected light issuing from the aperture with substantial uniformity throughout its field of spread in order to direct a definite spreading beam back towards and visible to an observer located a substantial distance outside of a line connecting the reflector with the light source. Where a series of reflecting units is employed, then the beams from the various apertures are spread, and these beams may merge so as to produce a composite or solid beam of light issuing from the entire aperture of the entire reflector composed of these units.

One or more of the reflecting surfaces may deviate as a whole slightly but sufficiently from true right angular relation; this deviation being designed with reference to the structure of the heterogeneous refracting means, so as to co-operate therewith, in order not only to slightly spread the reflected light, but so as to spread it with substantial uniformity throughout its field of spread. Moreover, the surfaces may be retained in their 90° relation, but one or more of these surfaces may have portions thereof varying from a true optical plane, so as to be at varying angles to the axis; and this may again be co-ordinated with reference to the heterogeneous refracting medium to secure the desired result.

Figure 5:
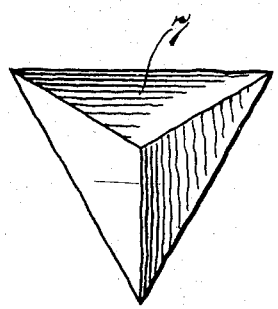
Figures 5 and 6 are views similar to Figures 1 and 2 respectively, but in which one or more surfaces of the central triple reflector are not optically plane.
Figure 6:
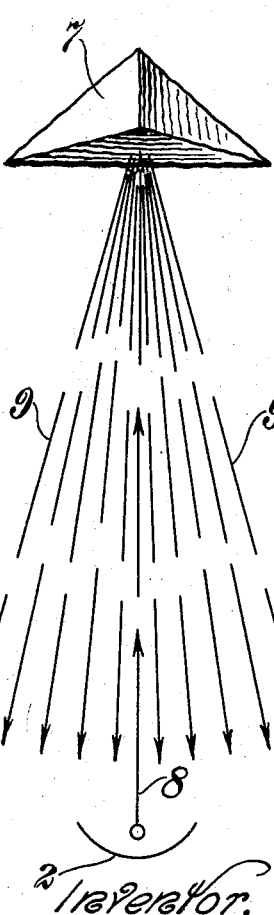

Figures 5 and 6 illustrate generally the principles of a reflector embodying this invention. In these figures, the reflector 7 may be of the prismatic type and may be constructed by pressing. The right angular relationship of the reflecting surfaces is generally maintained, but the surfaces are not optically accurate in the accepted sense of the term, but only an approximation thereof. There are, accordingly, irregularities that result in a symmetrical spreading of the light successively reflected by these surfaces about the reflector axis and back in the general direction of the light source. As shown in Figures 5 and 6, the irregularities have been exaggerated. The impinging beam 8 from the light source 2 is reflected to form a spreading beam 9 of substantially uniform intensity. The beam structure is, however, maintained, since the variations from true optical relation are not sufficient to scatter the light out of a defined beam or field. It will, therefore, be seen that the reflected light is spread with substantial uniformity throughout its field of spread, but in order to direct a definite spreading beam back towards and visible to an observer located a substantial distance outside of a line connecting the reflector with the light source. In general, the reflector shown in Figures 5 and 6 may be of the character and as fully described in Patent No. 1,671,086, granted May 22, 1928, on application Serial No. 650,402, of which this application is a continuation in part.

Figure 7:
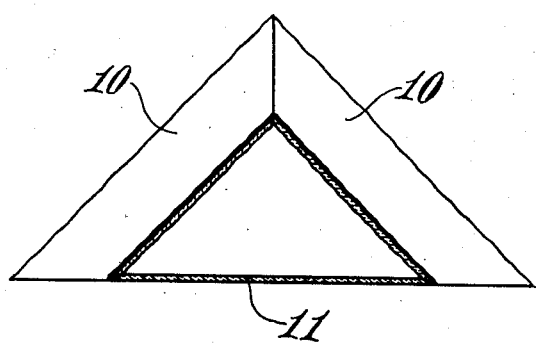
Figure 7 is a cross-sectional view of a reflector embodying this invention in which the reflectors themselves are constructed of uneven transparent material silvered on the back thereof and provided with a plane cover glass.

In the embodiment of Figure 7 the mirrors 10 are constructed of transparent material such as glass but the surfaces thereof are not optically true or plane although the ninety degree relation between the reflectors is approximately maintained. Such a reflector may be constructed of ordinary window glass which as is well known has neither optically true plane surfaces nor is it homogeneous nor uniform in its internal texture but forms a heterogeneous refracting medium. This variation from uniformity in the case of ordinary window glass is sufficient to produce the distortion of the reflected light required to produce a substantially uniform reflected beam. Such distortion may be caused by either or both of two features. First the unevenness of the reflecting surfaces produces slight variations in the angles of the reflected rays. Second the reflected rays pass through a heterogeneous or a non-homogeneous medium which, on account of its unevenness of texture, has a variable refractive index from point to point throughout its structure. Consequently the reflected rays, even when reflected from an optically true surface, are scattered or diffused by the variable refractive action of the glass or medium through which the light must pass after leaving the reflecting surface. Accordingly such a reflector will reflect the incident light in the form of a spreading beam substantially uniform throughout its field of spread. In the embodiment of Figure 7 the cover glass 11 is shown as a straight or plane sheet which will have no further diffusing effect on the beam.

Figure 8:
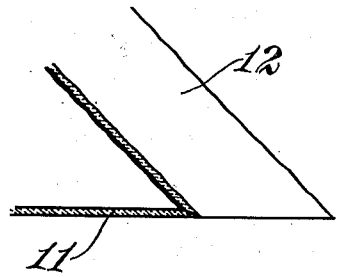
Figure 8 is a similar view but showing the reflector silvered on the front.

In the case of Figure 8 the reflector 12 is silvered on the front side as indicated by the heavy line. In this case the diffusive action is produced by the variation in the angles of the reflected rays only since in this case the light does not pass through the material of the reflector 12. The cover glass 11 is in this case also a plane sheet.

Figure 9:
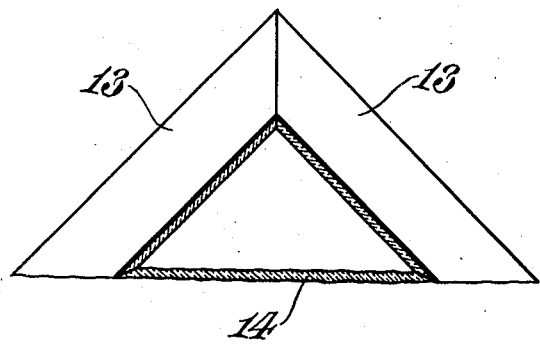
Figure 9 shows a similar view except that in this case the mirrors are plane while the cover glass is of uneven material.

In the embodiment of Figure 9 the reflectors 13 are shown as constructed of plane sheets silvered on the back. For the purpose of this invention, however, these reflectors may also be constructed of uneven or heterogeneous sheets as in the case of Figure 7. In Figure 9, however, the cover glass 14 is constructed of an uneven or heterogeneous sheet of glass or other transparent material, that is a sheet whose surfaces are not optically true planes. Common window glass on account of its uneven properties pointed out above is suitable for this purpose. In the operation of the device of Figure 9 the reflected light must pass through the uneven heterogeneous, or non-homogeneous medium provided by the cover glass 14 which has the effect as previously described of causing diffusion of the reflected light into the form of a beam of substantially uniform intensity. The action of the cover glass 14 in causing diffusion of the light is substantially the same as the action of the material of the reflectors 10 in Figure 7. The fact that the cover glass 14 is interposed in the path of the reflected light at a greater distance from the reflecting surfaces than in the case of Figure 7 does not materially alter the action.

Figure 10:
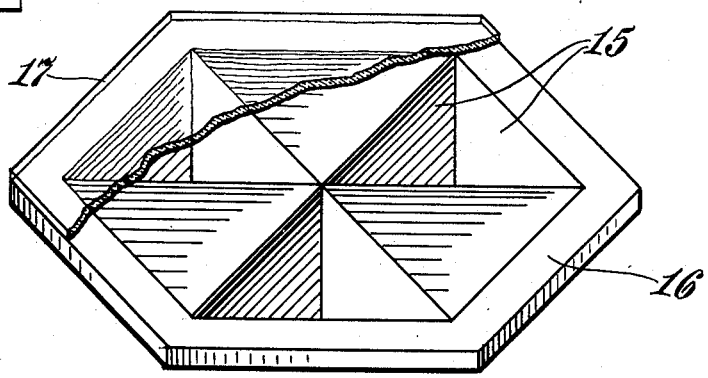
Figure 10 shows a reflecting device embodying this invention consisting of a group of reflectors and an uneven cover glass.

Figure 10 shows a way of combining a series of reflectors so as to form a series of reflectors arranged in a group. Each set of three reflectors 15 is constructed as heretofore described and the latter may be arranged in compact groups of two or more as shown in Figure 10 which illustrates a group of six arranged in the form of a hexagon. The reflectors may be placed in any suitable kind of frame or support 16 and may be provided with a protective cover glass 17. These reflectors may be made up in accordance with the construction shown in any of the Figures 7, 8 or 9. The reflectors 15 may be plane and the cover glass 17 uneven or heterogeneous as illustrated in Figure 9; the reflectors 15 may be uneven or hetrogeneous and the cover glass 17 plane as illustrated in Figure 7; or the construction of Figure 8 may be used in which the mirrors 15 are uneven or heterogeneous and silvered on their front sides while the cover glass 17 is plane, or both the mirrors and the cover glass may be uneven or heterogeneous.

In making up a group of reflectors according to Figure 10 any number of reflectors constructed as heretofore described may be combined to form a composite reflector of any desired size and shape. The individual reflectors may be large or small and may be constructed in accordance with any of the devices of Figures 7, 8 or 9. The assembled group may be used with or without a cover glass 17.

It will be seen, therefore, that this invention provides a reflector by which a beam of incident light is reflected in the form of a substantially conical beam of practically uniform intensity throughout its cross section. The reflected light is slightly diffused by being reflected from slightly uneven or heterogeneous surfaces or by being made to pass through an uneven, heterogeneous, or non-homogeneous medium which itself operates to slightly diffuse the light passing therethrough. The result is that the reflected beam may be seen from any point within a certain limited angular distance of the source of incident light. In other words a beam of light projected against a reflector constructed in accordance with this invention and from any angle, within limits, with respect to the axis of the reflector will be reflected back to the source of incident light in the form of a slightly spreading beam which may be seen from any point within a certain radius of said sources. On account of such diffusion the surface of the reflector will appear to the observer as being uniformly illuminated.

While the invention is particularly applicable to the general type of reflectors specifically shown and described, it will be understood that certain features of this invention are applicable in many cases to other forms and types of reflectors. It will furthermore be understood that certain features and sub-combinations are of utility and may be employed without reference to other features and sub-combinations; that is contemplated by and is within the scope of the appended claims.

It is obvious that various changes may be made in the details of construction, within the scope of the appended claims, without departing from the spirit of this invention; it is to be understood, therefore, that this invention is not to be limited to the specific details shown and described.

Having thus described the invention what is claimed is:

1. In a light reflector signal, the combination of a plurality of groups of reflectors, each group comprising three reflecting surfaces at right angles to each other, and the said groups being arranged in contiguous relation to each other and the said groups of reflectors also being arranged around a central point, and diffusing means in front of said groups of reflectors whereby the light reflected from the reflecting surfaces of the reflectors of the respective groups is manifested by spots of light in front of the reflectors of the said groups.

2. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, and means adapted to spread the reflected light with substantial uniformity throughout its field of spread in order to direct a spreading beam back towards and visible to an observer located a substantial distance outside of a line connecting the reflector with the light source.

3. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, and means in front of and cooperating with said reflecting surfaces adapted to spread the reflected light with substantial uniformity throughout its field of spread in order to direct a spreading beam back towards and visible to an observer located a substantial distance outside of a line connecting the reflector with the light source.

4. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, and heterogeneous refracting means in front of and cooperating with said reflecting surfaces adapted to spread the reflected light with substantial uniformity throughout its field of spread in order to direct a spreading beam back towards and visible to an observer located a substantial distance outside of a line connecting the reflector with the light source.

5. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, and means cooperating with said reflecting surfaces adapted to heterogeneously refract the light issuing from the reflector aperture outside of the otherwise normal reflected path in order to direct a spreading beam back toward and visible to an observer located a substantial distance outside of a line connecting the reflector with the light source.

6. A reflecting device of the character described, having a series of reflecting units arranged in contiguous relation, each of said units comprising a series of reflecting surfaces arranged relatively at approximate right angles and in a circuit around the axis thereof so that light impinging thereon from a distant source will be successively reflected by said surfaces about said axis and back in the general direction of the light source, and means adapted to spread the reflected light issuing from each unit aperture with substantial uniformity throughout its field of spread in order to direct spreading beams back toward and visible to an observer located a substantial distance outside of a line connecting the reflector with the light source.

7. A reflecting device of the character described, having a series of reflecting units arranged in contiguous relation around a central point, each of said units comprising a series of reflecting surfaces arranged relatively at approximate right angles and in a circuit around the axis thereof so that light impinging thereon from a distant source will be successively reflected by said surfaces about said axis and back in the general direction of the light source, and means adapted to spread the reflected light issuing from each unit aperture with substantial uniformity throughout its field of spread in order to direct spreading beams back toward and visible to an observer located a substantial distance outside of a line connecting the reflector with the light source.

8. A reflecting device of the character described, having a series of reflecting units arranged in contiguous relation, each of said units comprising a series of reflecting surfaces arranged relatively at approximate right angles and in a circuit around the axis thereof so that light impinging thereon from a distant source will be successively reflected by said surfaces about said axis and back in the general direction of the light source, and heterogeneous refracting means in front of and cooperating with the reflecting surfaces of the contiguous units adapted to spread the reflected light issuing from each unit aperture with substantial uniformity throughout its field of spread in order to direct spreading beams back toward and visible to an observer located a substantial distance outside of a line connecting the reflector with the light source.

In testimony whereof I affix my signature this 14th day of July, 1925.

JONATHAN C. STIMSON.